United States Patent
Robinson et al.

(10) Patent No.: US 11,956,309 B1
(45) Date of Patent: Apr. 9, 2024

(54) INTERMEDIARY CLIENT RECONNECTION TO A PREFERRED SERVER IN A HIGH AVAILABILITY SERVER CLUSTER

(71) Applicant: International Business Machines Corporation, Armonk, NY (US)

(72) Inventors: Katherine Jane Susan Robinson, Hants (GB); Philip I Wakelin, Eastleigh (GB); Michael D. Brooks, Southampton (GB); Alan Hollingshead, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/064,951

(22) Filed: Dec. 13, 2022

(51) Int. Cl.
 *G06F 15/16* (2006.01)
 *H04L 43/0811* (2022.01)
 (Continued)

(52) U.S. Cl.
 CPC ...... *H04L 67/1038* (2013.01); *H04L 43/0811* (2013.01); *H04L 67/101* (2013.01);
 (Continued)

(58) Field of Classification Search
 CPC ............. H04L 67/101; H04L 67/1027; H04L 67/1031; H04L 67/1038; H04L 67/60; H04L 43/0811
 (Continued)

(56) References Cited

U.S. PATENT DOCUMENTS 6,308,221 B1  10/2001  Perlman
6,615,265 B1 *  9/2003  Leymann ............ H04L 67/1001
                                                  709/227

(Continued)

FOREIGN PATENT DOCUMENTS

AU   2011314226 B2   2/2015
CN   111917846 A    11/2020

OTHER PUBLICATIONS

"Architecture", ISTIO, downloaded from the Internet on Oct. 27, 2022, 3 pages, <https://istio.io/latest/docs/ops/deployment/architecture/>.

(Continued)

*Primary Examiner* — Bharat Barot
(74) *Attorney, Agent, or Firm* — Teddi E. Maranzano

(57) ABSTRACT

A method for intermediary client reconnection to a preferred server in a high availability server cluster. The method includes monitoring a persistent connection of a logical connection to a preferred server to identify an unavailability of the preferred server, establishing a temporary persistent connection for the logical connection to an available server to replace an unavailable preferred server, prompting attempts to reconnect to the preferred server at intervals, and providing a connection switching pool and simultaneously re-establishing a persistent connection with the preferred server for the logical connection using the connection switching pool while terminating the temporary persistent connection to the available server. The connection switching pool and a main connection pool used by the persistent connection allow for simultaneously maintaining two connections to different servers in a same server cluster for the logical connection.

20 Claims, 9 Drawing Sheets

(51) Int. Cl.
*H04L 67/101* (2022.01)
*H04L 67/1027* (2022.01)
*H04L 67/1031* (2022.01)
*H04L 67/1038* (2022.01)
*H04L 67/60* (2022.01)

(52) U.S. Cl.
CPC ...... *H04L 67/1027* (2013.01); *H04L 67/1031* (2013.01); *H04L 67/60* (2022.05)

(58) Field of Classification Search
USPC .................................. 709/202–203, 223–224
See application file for complete search history.

(56) References Cited

U.S. PATENT DOCUMENTS

| | | | |
|---|---|---|---|
| 7,512,707 B1* | 3/2009 | Manapragada | H04L 67/1023 709/240 |
| 9,596,297 B2* | 3/2017 | Sramka | H04L 67/01 |
| 9,936,048 B2 | 4/2018 | Allen | |
| 9,948,707 B2 | 4/2018 | Allen | |
| 10,250,507 B2 | 4/2019 | Jones | |
| 10,637,918 B2* | 4/2020 | Dobies | H04L 67/1001 |
| 2005/0165885 A1* | 7/2005 | Wong | H04L 67/1027 709/201 |
| 2006/0168079 A1 | 7/2006 | Shen | |
| 2016/0112304 A1 | 4/2016 | Allen | |
| 2017/0366524 A1 | 12/2017 | Lee | |
| 2018/0191663 A1* | 7/2018 | Harpaz | H04L 51/52 |
| 2018/0288141 A1* | 10/2018 | Mo | H04L 67/1023 |
| 2021/0144200 A1 | 5/2021 | Brooks | |
| 2022/0094751 A1 | 3/2022 | Szczesniak | |

OTHER PUBLICATIONS

"CICS IPIC high availability", IBM, Last Updated: Jul. 29, 2022, 5 pages, <https://www.ibm.com/docs/en/zosconnect/3.0?topic=sors-cics-ipic-high-availability>.

"IPIC high availability feature", IBM, Last Updated: Apr. 29, 2022, 2 pages, <https://www.ibm.com/docs/en/cics-ts/5.6?topic=interconnectivity-ipic-high-availability-feature>.

"IWM4HLTH—Setting server health indicator", Last Updated Apr. 12, 2021, <https://www.ibm.com/docs/en/zos/2.4.0?topic=services-iwm4hlth-setting-server-health-indicator)>, downloaded from the Internet on Oct. 26, 2022, 16 pages.

"Sysplex distributor", IBM, Last Updated: Jul. 29, 2022, 2 pages, <https://www.ibm.com/docs/en/zosconnect/3.0?topic=availability-sysplex-distributor>.

"What is a service mesh?", Linkerd, downloaded from the Internet on Oct. 17, 2022, 4 pages, <https://linkerd.io/what-is-a-service-mesh/#>.

"What is Envoy", Envoy, downloaded from the Internet on Oct. 17, 2022, 3 pages, <https://www.envoyproxy.io/docs/envoy/latest/intro/what_is_envoy>.

* cited by examiner

INTERMEDIARY CLIENT RECONNECTION TO A PREFERRED SERVER IN A HIGH AVAILABILITY SERVER CLUSTER

BACKGROUND

The present invention relates to server clusters, and more specifically, to intermediary client reconnection to a preferred server in a high availability server cluster.

A cluster of servers work together to perform tasks that are controlled and scheduled by software. High availability clusters are groups of servers that support server applications that can have a high reliability with a minimum amount of down-time. The clusters operate by using high availability software to harness redundant servers in clusters that provide continued service when system components fail.

Client systems of users send requests to a server cluster via the internet to a load balancer that distributes application traffic across the servers in a cluster. The load balancer provides high availability and reliability by sending requests only to servers that are online.

An intermediary client system, such as a transaction gateway or application programming interface (API) gateway, may offer high availability support for client systems using the server cluster. Persistent connections may be established by the intermediary client system with a sequence of messages that exchange its capabilities with the server system it connects to, which in turn returns its own capabilities. The connection then persists until it is closed by either system, or as the result of a communications error occurring.

SUMMARY

Aspects of the present invention are defined in the attached claims.

According to an embodiment of the present invention, a computer-implemented method for intermediary client reconnection to a preferred server in a high availability server cluster is disclosed. The computer-implemented method includes monitoring a persistent connection of a logical connection to a preferred server to identify an unavailability of the preferred server. The computer-implemented method further includes establishing a temporary persistent connection for the logical connection to an available server to replace an unavailable preferred server, wherein the temporary persistent connection uses the main connection pool. The computer-implemented method further includes prompting attempts to reconnect to the preferred server at interval. The computer-implemented method further includes providing a connection switching pool and simultaneously re-establishing a persistent connection with the preferred server for the logical connection using the connection switching pool while terminating the temporary persistent connection to the available server. The connection switching pool and a main connection pool used by the persistent connection allow for simultaneously maintaining two connections to different servers in a same server cluster for the logical connection.

According to another embodiment of the present invention, a computer system for intermediary client reconnection to a preferred server in a high availability server cluster is disclosed. The computer system includes one or more computer processors, one or more computer readable storage media, and computer program instructions, the computer program instructions being stored on the one or more computer readable storage media for execution by the one or more computer processors. The program instructions include instructions to monitor a persistent connection of a logical connection to a preferred server to identify an unavailability of the preferred server. The program instructions further include instructions to establish a temporary persistent connection for the logical connection to an available server to replace an unavailable preferred server, wherein the temporary persistent connection uses the main connection pool. The program instructions further include instructions to prompt attempts to reconnect to the preferred server at intervals. The program instructions further include instructions to provide a connection switching pool and simultaneously re-establishing a persistent connection with the preferred server for the logical connection using the connection switching pool while terminating the temporary persistent connection to the available server. The connection switching pool and a main connection pool used by the persistent connection allow for simultaneously maintaining two connections to different servers in a same server cluster for the logical connection.

According to a further embodiment of the present invention a computer program product for intermediary client reconnection to a preferred server in a high availability server cluster. The computer program product includes one or more computer readable storage media and program instructions stored on the one or more computer readable storage media. The program instructions include instructions to monitor a persistent connection of a logical connection to a preferred server to identify an unavailability of the preferred server, wherein the persistent connection uses a main connection pool. The program instructions further include instructions to establish a temporary persistent connection for the logical connection to an available server to replace an unavailable preferred server, wherein the temporary persistent connection uses the main connection pool. The program instructions further include instructions to prompt attempts to reconnect to the preferred server at intervals. The program instructions further include instructions to provide a connection switching pool and simultaneously re-establishing a persistent connection with the preferred server for the logical connection using the connection switching pool while terminating the temporary persistent connection to the available server. The connection switching pool and a main connection pool used by the persistent connection allow for simultaneously maintaining two connections to different servers in a same server cluster for the logical connection.

BRIEF DESCRIPTION OF THE DRAWINGS

Embodiments of the present invention will now be described, by way of example only, with reference to the accompanying drawings.

Figure 1:
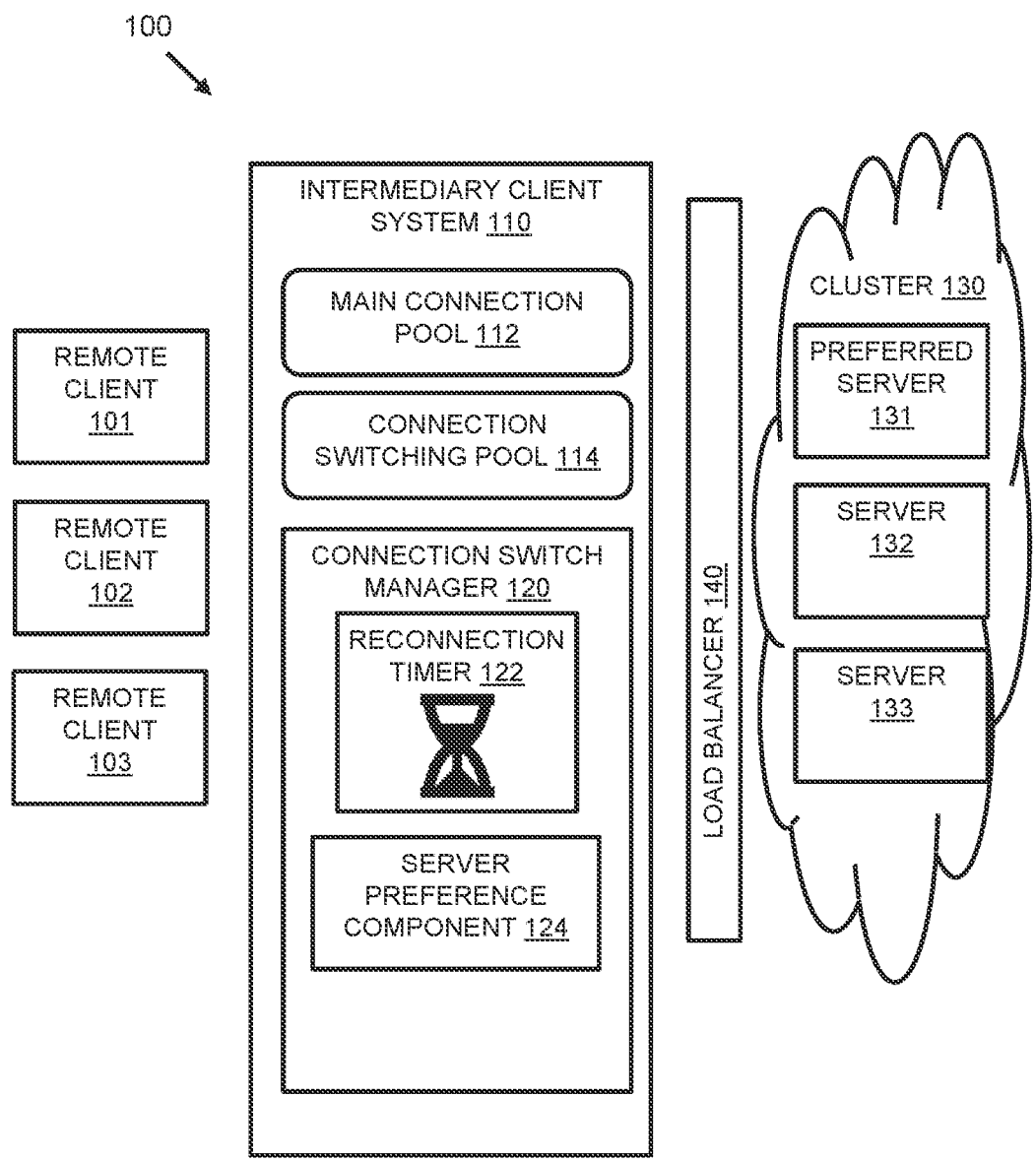
FIG. 1 is a block diagram of an example embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for intermediary client reconnection to a preferred server in a high availability server cluster.

Embodiments of the present invention recognize the need for a client can seamlessly reconnect to a preferred server within a high availability cluster after a server suffers an outage or is restarted. The described method, system, and computer program product provide seamless reconnection to a preferred server for an intermediary client system in a high availability server cluster. The intermediary client system acts as an intermediary for a set of remote clients that route work to server systems. The intermediary client system has information of the server cluster members which the remote clients do not have.

The intermediary client system connects to the server cluster with persistent or long-lived connections that provide sessions used by remote clients. The described method handles such persistent connections to ensure that they are not skewed away from a preferred server of the intermediary client system.

An interconnectivity protocol provides the ability to control which client systems can connect to a cluster of server regions based on supplied connection parameters and enables each system to confirm the identity of its partner. The protocol may have a capability exchange flow request to establish a persistent connection between client and server systems. A capability exchange flow request and response for connection using the protocol is used in the described method to determine if a reconnection request is to a preferred server. A persistent connection has a defined number of sessions, each session can be used by one remote client request at a time. Once a remote client request has finished with a session it is reused by another remote client request.

The preferred server reconnection is an improvement in the technical field of providing high availability computer transactions to client systems by a server cluster. Embodiments of the present invention can be implemented without making changes to the Internet Protocol (IP) loading balancing layer or requiring any changes to the service infrastructure.

In the described method and system, an intermediary client system opens a persistent connection to a server member within a highly available cluster of server systems. If this connection is found not to be to the intermediary client's preferred server, the intermediary client system can reconnect to the preferred server at a later point in time without disconnecting a current server. The intermediary client system may then seamlessly phase out requests running in the current server whilst routing any new requests to the preferred server. This method allows individual servers to be recycled without interfering with the intermediary client's ability to use the server cluster, and then allows an intermediary client's preference to be resolved later on.

Embodiments of the present invention are designed as an extension to the high availability support in the CICS IPIC protocol. IP interconnectivity (IPIC) is a type of intercommunication link that enables you to integrate CICS-to-CICS communications into an IP infrastructure and use the secure sockets layer (SSL) to provide security. When using IPIC, connections between middleware components persistent connections are established by a client system with a sequence of messages that exchange its capabilities with the server system it connects to, which in turn returns its own capabilities. This sequence is known as the CAPEX. The connection then persists until it is closed by either system, or as the result of a communications error occurring.

Referring to FIG. 1, a block diagram 100 shows an example embodiment of a system for intermediary client reconnection to a preferred server in a high availability server cluster.

An intermediary client system 110 is provided for requests from remote clients 101-103 to a high availability server cluster 130. The intermediary client system persistent connections to the server cluster 130 are handled by a load balancer 140 that uses its standard algorithms to decide which is the most suitable server 131-133 in the cluster 130 for a connection in order to distribute and balance network or application traffic across the servers.

The intermediary client system 110 includes a main connection pool 112 for requests to a persistent connection with a server and a connection switching pool 114 that allows two persistent connections to be open in parallel for one logical connection. The concept provides two connections to one logical server, with each connection providing a pool of reusable sessions.

The use of a main connection pool 112 and a connection switching pool 114 enables an overlap of server connections in order to reconnect to a preferred server without losing connection for the logical connection of the intermediary client system 110. A connection switch status of the logical connection is used to determine whether a reconnection attempt is required and is used in managing the dual connections that can underlie the single logical connection when switching connections.

The described system includes a connection switch manager 120 at the intermediary client system 110 for providing the described client reconnection to a preferred server 131 in the cluster 130. The connection switch manager 120 includes a server preference component 124 for configured client preferences and a reconnection timer 122 that may be configured to time reconnection requests to a preferred server. This allows the system to provide the ability to return to use of a preferred server within a high availability environment.

The solution is localized in the intermediary client layer and the load balancer is always used for connection distribution. The preference for the server affinity may be set at different levels, for example, Internet Protocol address, port, or server identifier.

Figure 2A:
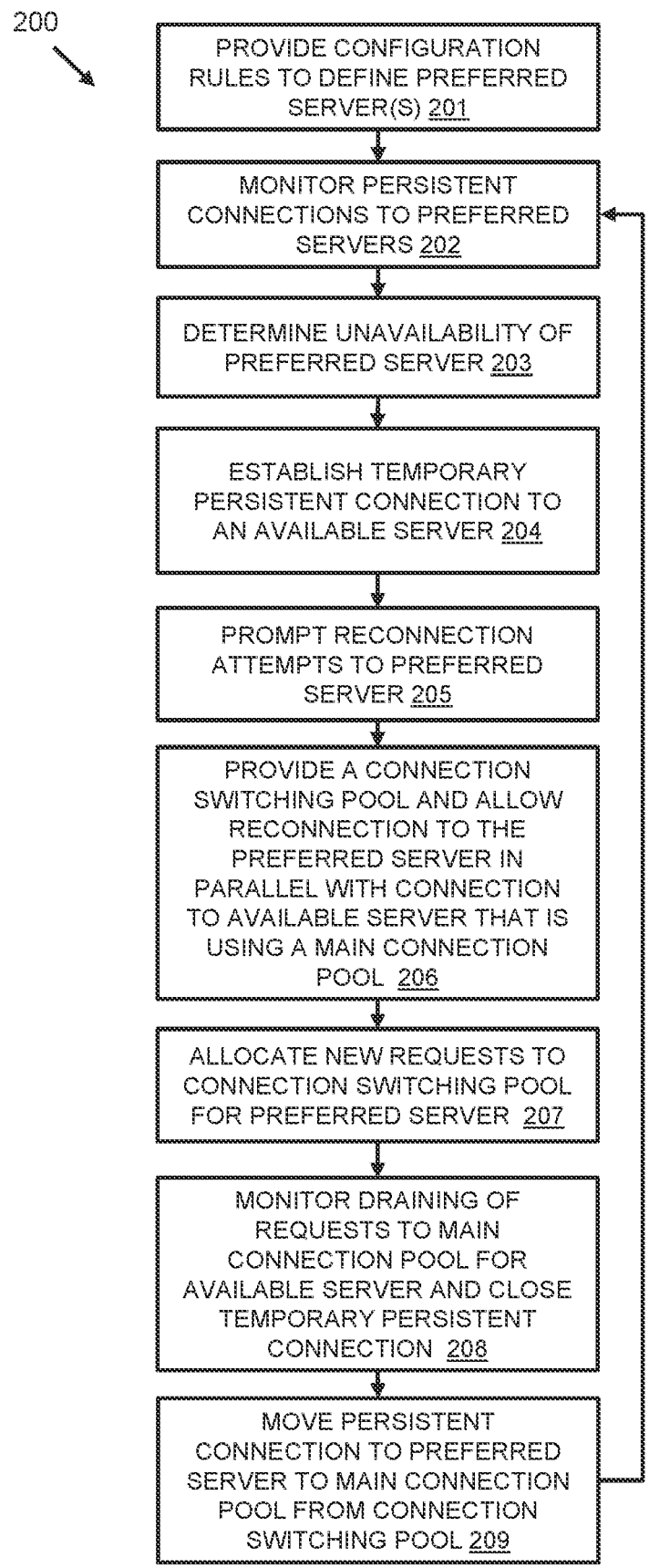
FIG. 2A is a flow diagram of an example embodiment of a method in accordance with the present invention.

Referring to FIG. 2A, a flow diagram 200 shows an example embodiment of the described computer-implemented method carried out at an intermediary client system by a connection switch manager.

The method begins by providing 201 configuration criteria or rules to define one or more preferred servers for the intermediary client. This may be a static configuration file using predefined connection metadata. Additional information may be obtained regarding the servers to determine a preferred server.

The method monitors 202 a current persistent connection of the intermediary client to a preferred server to determine 203 when the preferred server becomes unavailable. The current persistent connection to a preferred server uses a main connection pool at the intermediary client system to handle requests from remote clients.

The method establishes 204 a temporary persistent connection to an available server selected by a high availability Internet Protocol (IP) load balancer to replace the unavailable preferred server. The load balancer uses its standard algorithms to decide which is the most suitable server within the server cluster and directs the connection request to that server. The temporary persistent connection uses the main connection pool.

The method prompts 205 attempts to reconnect to the preferred server at intervals. Attempts to reconnect to the preferred server are carried out via the load balancer and may use a capability request flow request of an interconnectivity protocol for connection to the server cluster.

Prompting attempts to reconnect to the preferred server may include using a reconnection timer and making a reconnection request to the preferred server when the reconnection timer expires. This includes analyzing a response from the load balancer to a reconnection request to determine if the response is for connection to a preferred server with the load balancer using a load balancing algorithm to select the server. In an embodiment, analyzing a response includes determining if the response meets the criteria. A proposed connection may be checked to see if it matches the preferred server and, if it is not the preferred server, the reconnection timer may be restarted without a change to the server. If it is the preferred server, a new persistent connection is made to the preferred server.

The method provides 206 a connection switching pool and reestablishing a persistent connection with the preferred server uses the connection switching pool with new requests allocated 207 to the connection switching pool for the preferred server. The connection switching pool and the main connection pool provide two connections to servers in the same server cluster for one logical connection. A status of the logical connection may be provided to define whether client requests are handled by the connection switching pool or the main connection pool.

The method monitors 208 the draining of requests using the main connection pool going to the available server and, once the requests are drained, the method closes the temporary persistent connection.

The method ends after moving 209 the persistent connection with the preferred server to the main connection pool from the connection switching pool to return to the initial state of a persistent connection to the preferred server using the main connection pool.

Figure 2B:
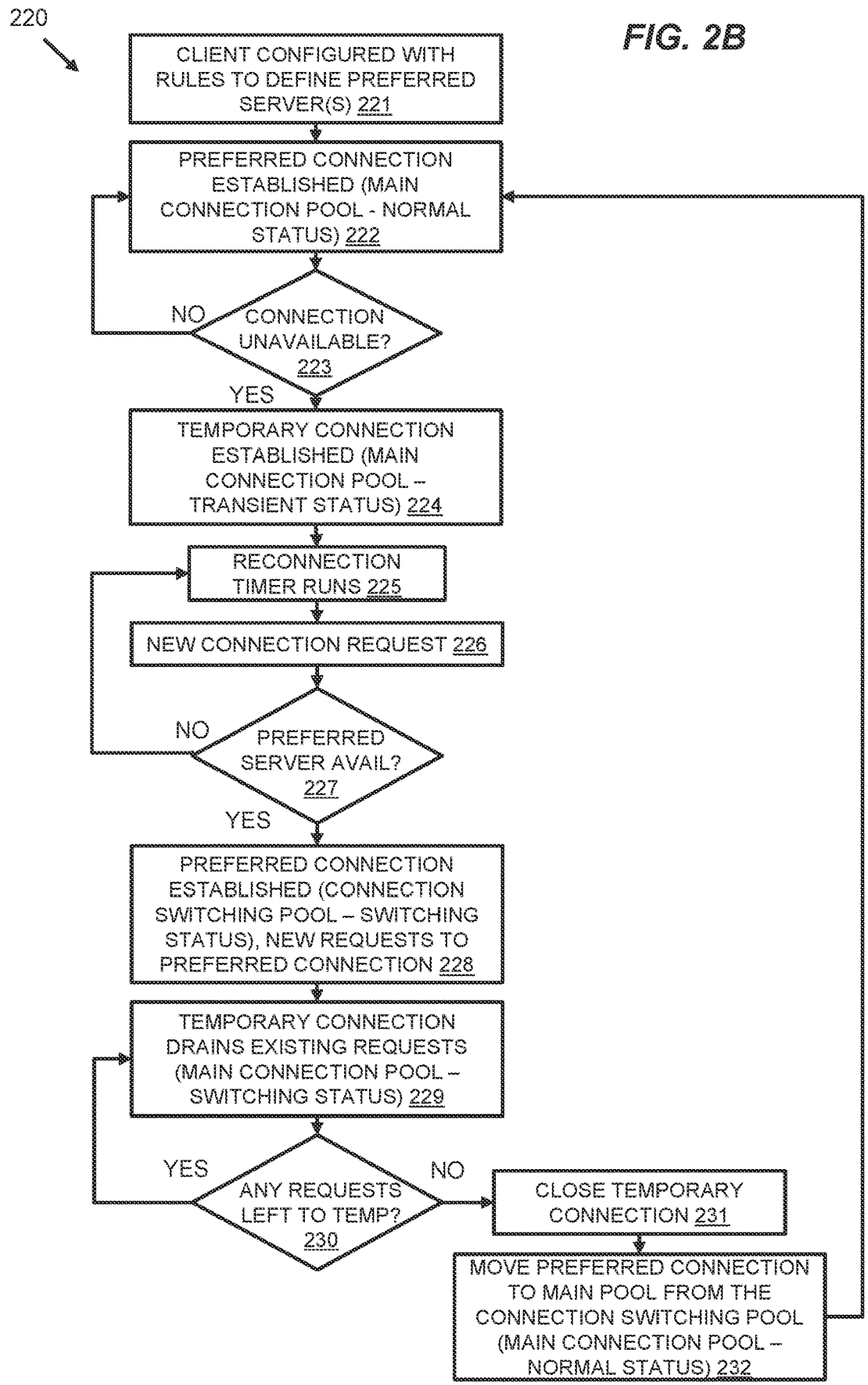
FIG. 2B is a flow diagram of another example embodiment of a method in accordance with the present invention.

Referring to FIG. 2B, a flow diagram 220 shows an example embodiment of the described computer-implemented method in terms of the persistent connections to the servers. The method beings by referencing 221 configuring rules for one or more preferred server(s) for a client.

For a single logical connection between an intermediary client system and a server cluster, a preferred connection is established 222 to a preferred server. The preferred connection uses a main connection pool for requests with the logical connection having a "normal" status.

It may be determined 223 if the connection to the preferred server becomes unavailable by monitoring the connection. If the connection becomes unavailable, a temporary connection is established 224 using the load balancer to a different available server for the single logical connection (223 "YES" branch). If the connection is available, the preferred connection is established 222 to a preferred server (223 "NO" branch). The temporary connection uses the main connection pool for requests and the logical connection has a "transient" connection status. A reconnection timer is started 225 and when the reconnection timer ends, a new reconnection request is made 226 to the load balancer to connect to a new server. The method may determine 227 if the preferred server is available. If it is not available, the method may restart the reconnection timer 225 (227 "NO" branch).

When the preferred server is available, a new preferred connection is established 228 with the preferred server (227 "YES" branch). Requests to the new preferred connection use a connection switching pool with all new requests going to this connection switching pool for the preferred server. The logical connection has a "switching" connection status.

The temporary connection in the "switching" state drains 229 requests to the available server using the main connection pool. It may be determined 230 if there are any remaining requests in the main connection pool for the temporary connection. If it is determined there is one or more remaining requests in the main connection pool for the temporary connection, returning to state drains 229 requests to the available server using the main connection pool (230 "YES" branch). Once there are no more requests, the method may close 231 the temporary connection (230 "NO" branch). The new preferred connection to the preferred server is moved 232 from the connection switching pool to the main connection pool and the status of the logical connection is changed from "switching" connection status to "normal" connection status.

Referring to FIGS. 3A to 3G, schematic diagrams 301-307 show an example embodiment of the described method of reconnection to a preferred server in a high availability server cluster. The intermediary client system 110 is shown in each diagram with the main connection pool 112 and a connection switching pool 114 as well as a connection switch manager 120 with a reconnection timer 122. Requests 150 from remote clients are handled by the intermediary client system 110. A load balancer 140 balances persistent connections to servers in a server cluster including a preferred server 131 and an available server 132.

The intermediary client is configured with rules to define preferred server(s). This preference is defined in a static configuration file using pre-defined connection metadata such as an IP address/port. However, this preference may use other information data provided by the partner in its connection response, such as a server application identifier. The intermediary client may also obtain additional information about the server to determine if the server is the preferred destination via third party application programming interfaces (APIs) such as a workload manager health service or the server's listening port's Transfer Control Protocol/Internet Protocol (TCP/IP) target server responsiveness or server efficiency value.

Figure 3A:
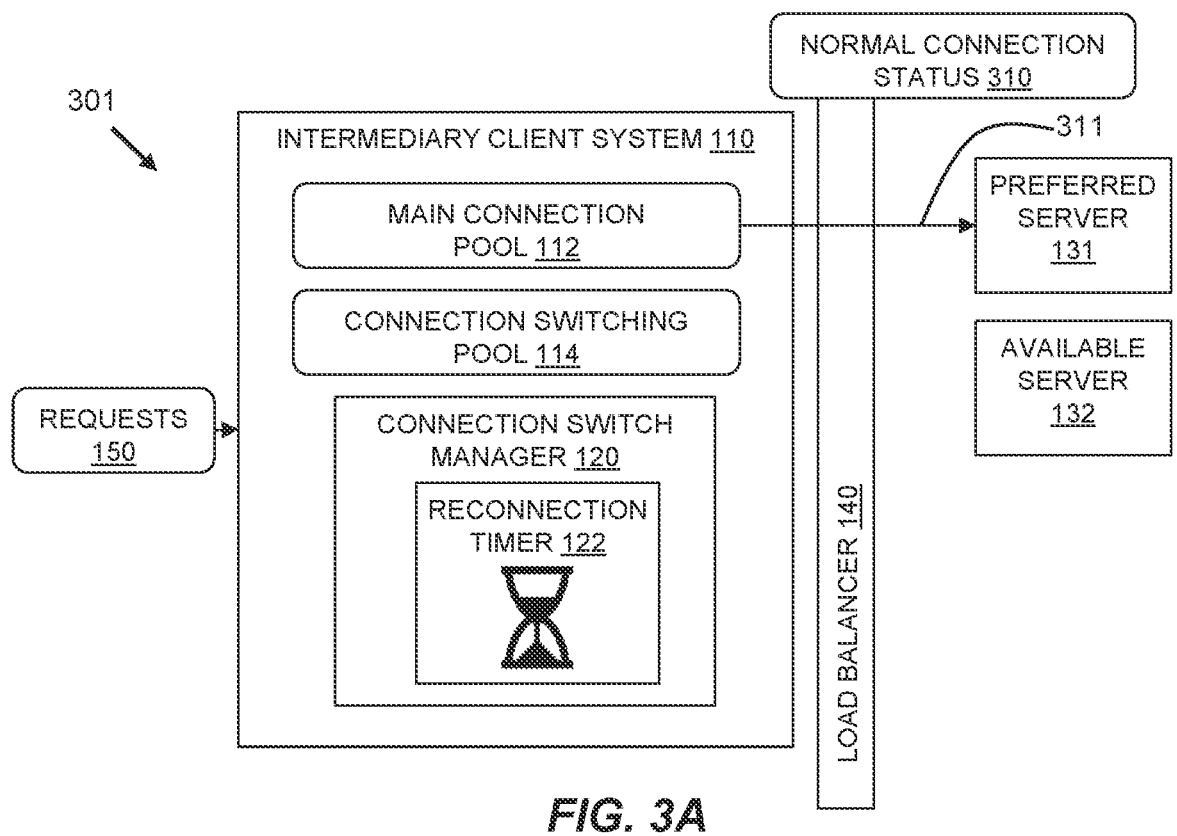
FIGS. 3A to 3G are block diagrams illustrating a series of states of an example embodiment of a method in accordance with the present invention.

Referring to FIG. 3A, the intermediary client system 110 sends a normal connection request 311 for a logical connection to a high availability endpoint via the load balancer 140. The load balancer 140 uses its standard algorithms to decide which is the most suitable server, such as preferred server 131 within the cluster and directs the connection request to that server. The preferred server 131 returns information in its connection response about its specific IP endpoint which the intermediary client system 110 should use for further connectivity. The intermediary client system 110 establishes a connection to the preferred server 131 using the specific IP endpoint and allows work to flow to it. In this scenario, the connected server is the preferred server 131. The logical connection status is "normal" connection 310.

Figure 3B:
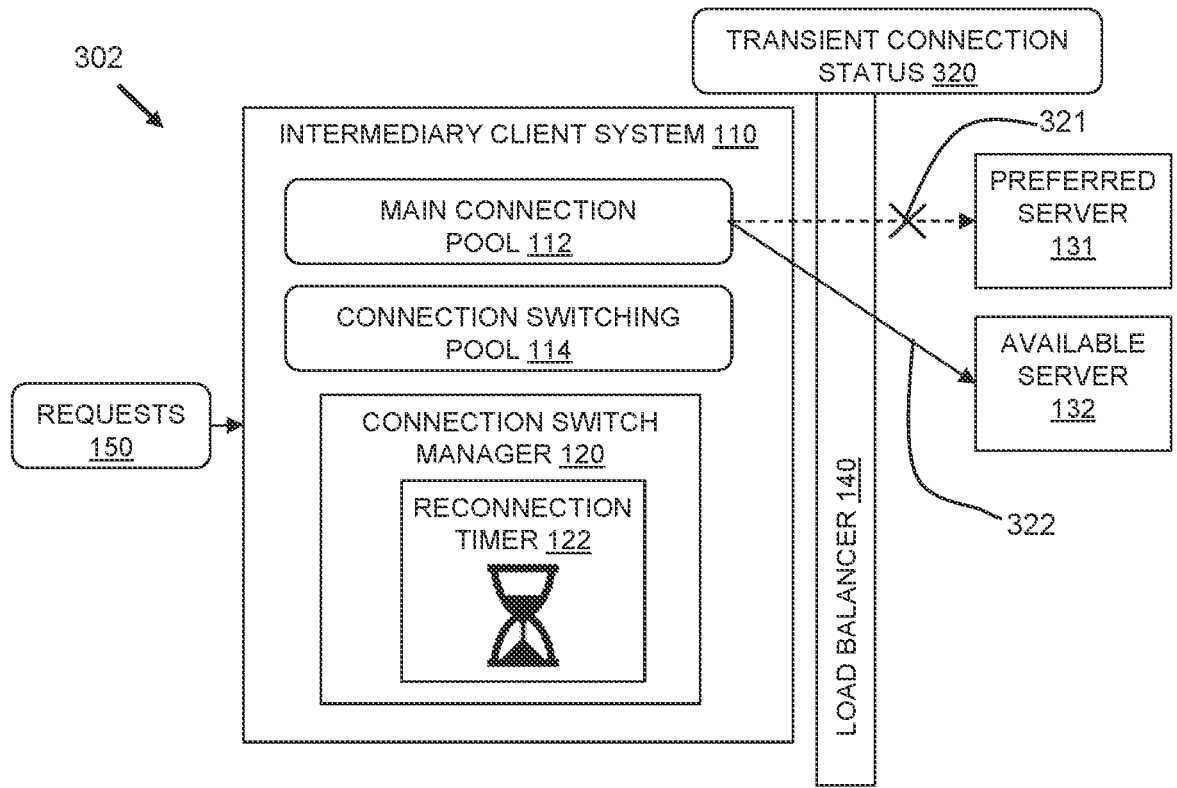

Referring to FIG. 3B, if the connection to the preferred server 131 becomes unavailable 321, the intermediary client system 110 establishes a new connection 322 to another available server 132 in the cluster using the load balancer's standard algorithm to decide which is the most suitable server within the cluster. The reconnection timer 122 is started. The intermediary client system 110 enters the "transient" connection status 320.

Figure 3C:
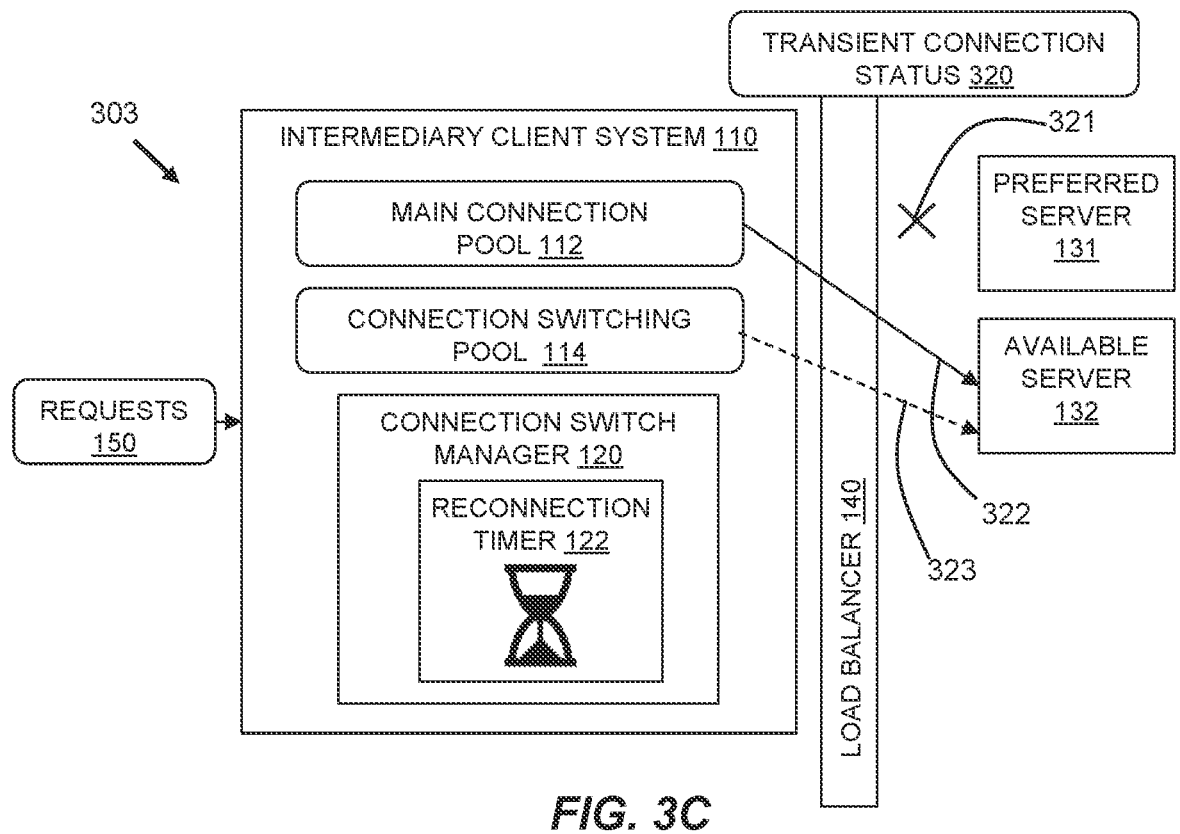

Referring to FIG. 3C, when the reconnection timer 122 interval expires, the intermediary client system 110 sends a connection request 323 to the high availability endpoint via the load balancer 140. The load balancer 140 uses its standard algorithms to decide which is the most suitable server within the cluster and directs the connection request to that server. The server returns information in its connection response about its specific IP endpoint. If the specific IP endpoint in the server's response does not match the preferred server 131, the logical connection remains in "transient" connection status 320. Work continues to flow to the available server 132 whilst the preferred server 131 is unavailable. When the reconnection timer 122 interval expires again, this is repeated.

If in FIG. 3A, the initial connection is not made to the preferred server 131, the method may start in the "transient" connection status of FIG. 3C and may attempt reconnections until it connects with the preferred server 131.

Figure 3D:
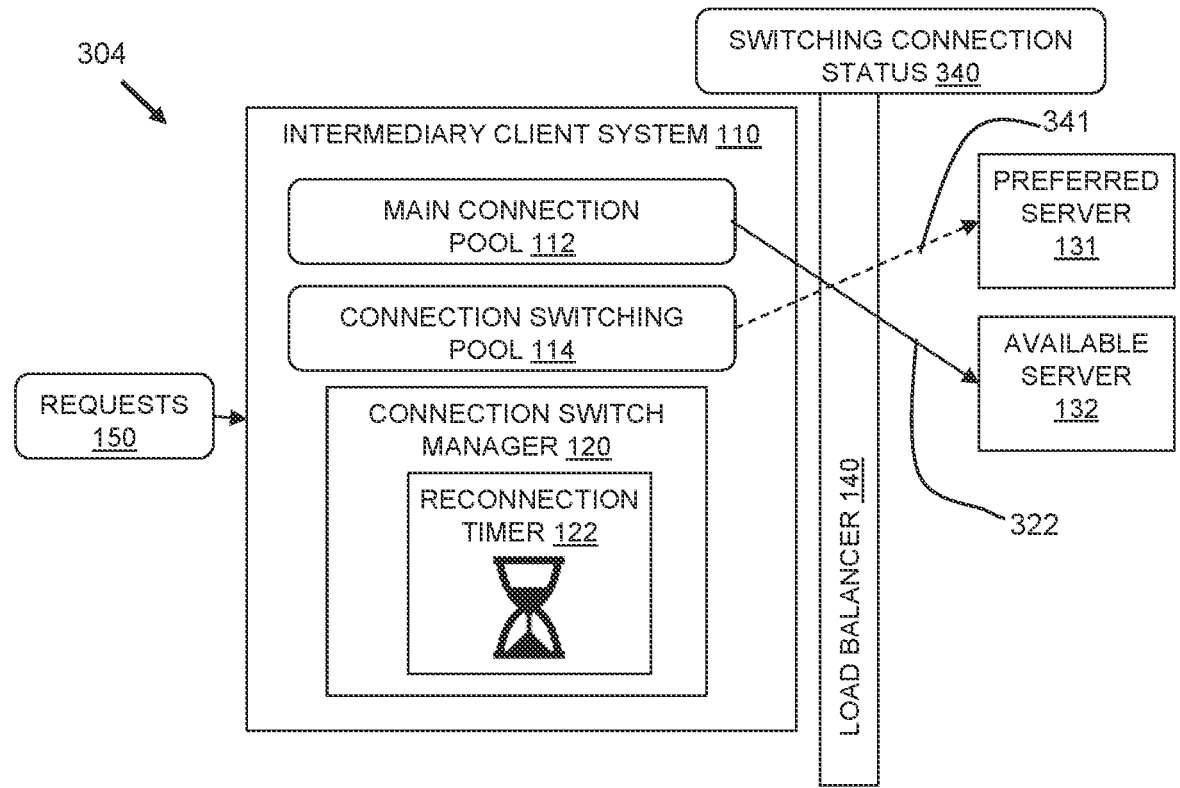

Referring to FIG. 3D, if the specific IP endpoint in the server's response to the request 341 matches the preferred server 131 (as the preferred server 131 is now available), the logical connection enters "switching" connection status 340.

Figure 3E:
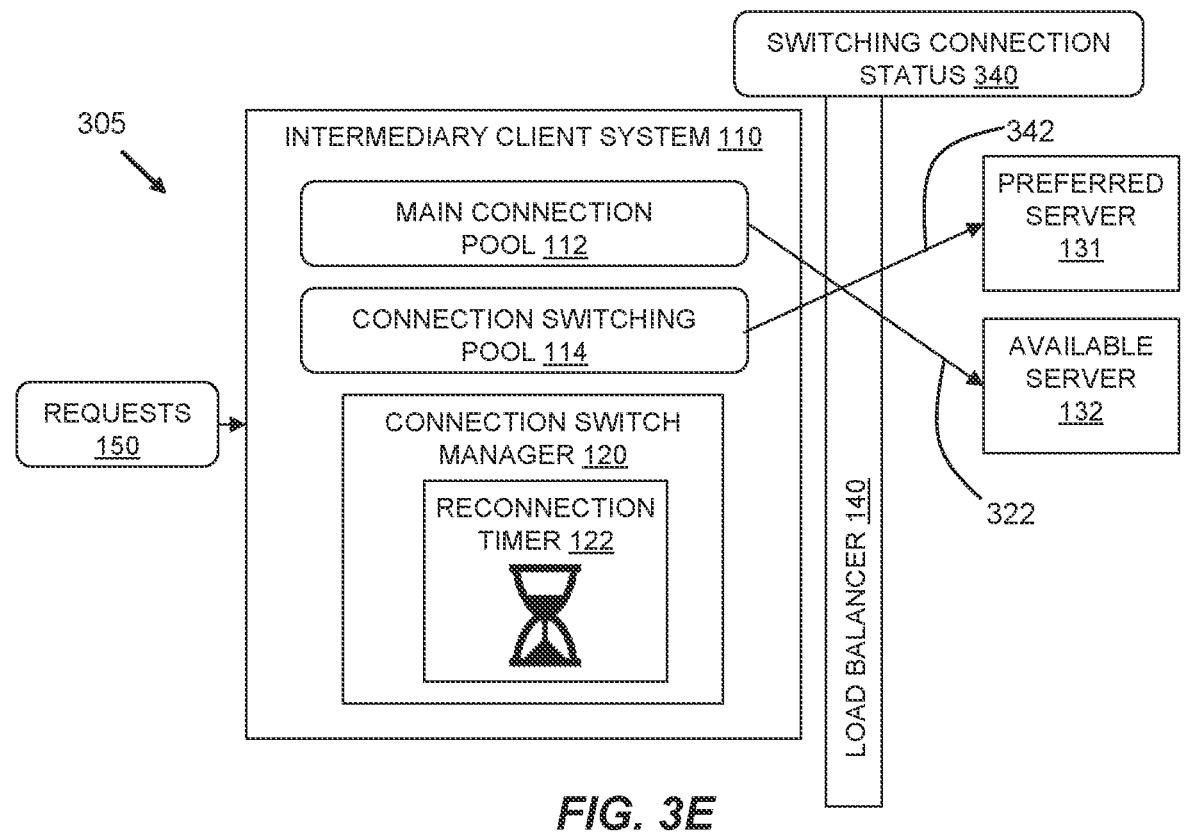

Referring to FIG. 3E, when the logical connection enters the "switching" connection status 340, the connection 342 to the preferred server's specific IP endpoint causes the intermediary client system 110 to have two connections to servers in the same cluster, for the single logical connection. The new connection 342 to the preferred server 131 uses a connection switching pool 114 to manage the underlying sessions used for individual requests. The connection switching pool 114 is separate to the main connection pool 112 used for existing server connections 322 to the available server 132.

Figure 3F:
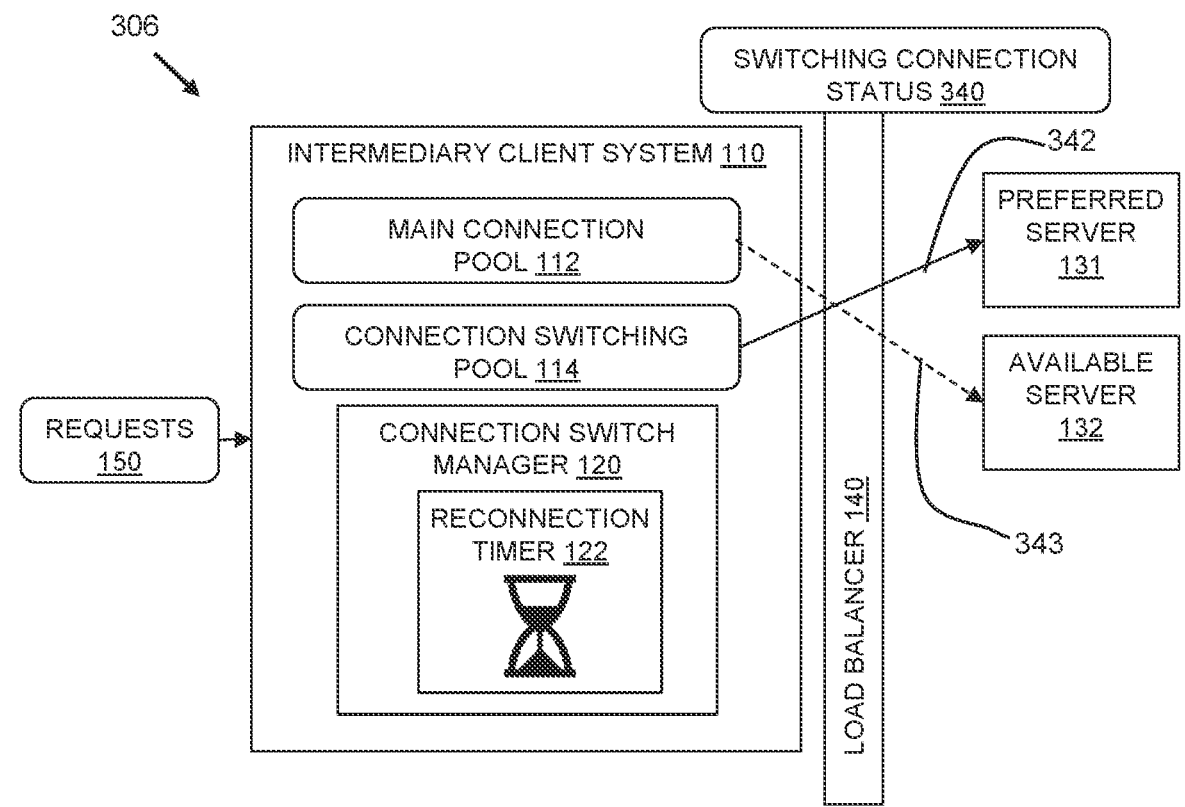

Referring to FIG. 3F, any new transaction requests 150 to the server cluster in the logical connection now always allocate sessions from the connection switching pool 114 and the main connection pool 112 is allowed to drain 343 any inflight requests.

Figure 3G:
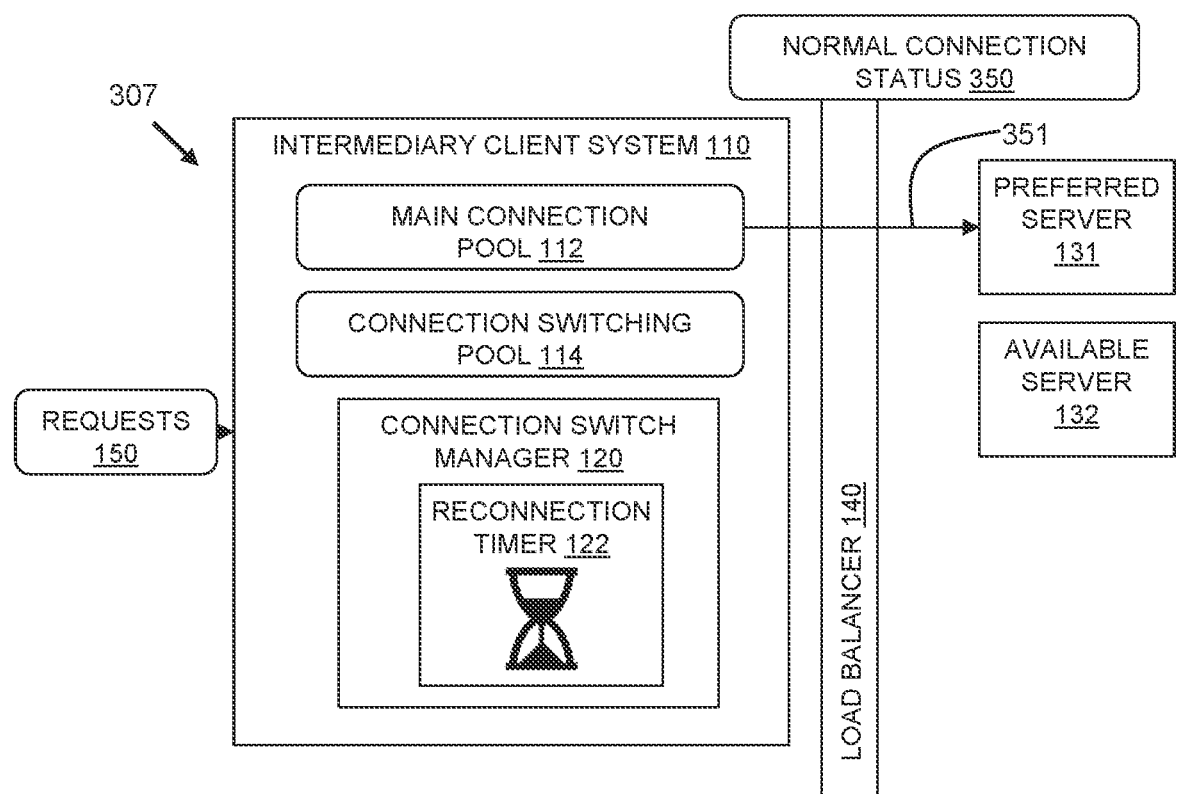

Referring to FIG. 3G, after each request to the server completes, the connection switch manager 120 checks the main connection pool 112 active request count and determines if there are any requests still in flight using sessions from the main connection pool. If the count is zero, then a connection termination processing is initiated to close down the connection to the IP endpoint associated with the main connection pool 112. Once the connection to the IP endpoint is successfully closed, the connection switch manager 120 moves the connection 351 from the connection switching pool 114 to the main connection pool 112. The logical connection is now back in "normal" connection status 350 and connected to the preferred server 131.

Figure 4:
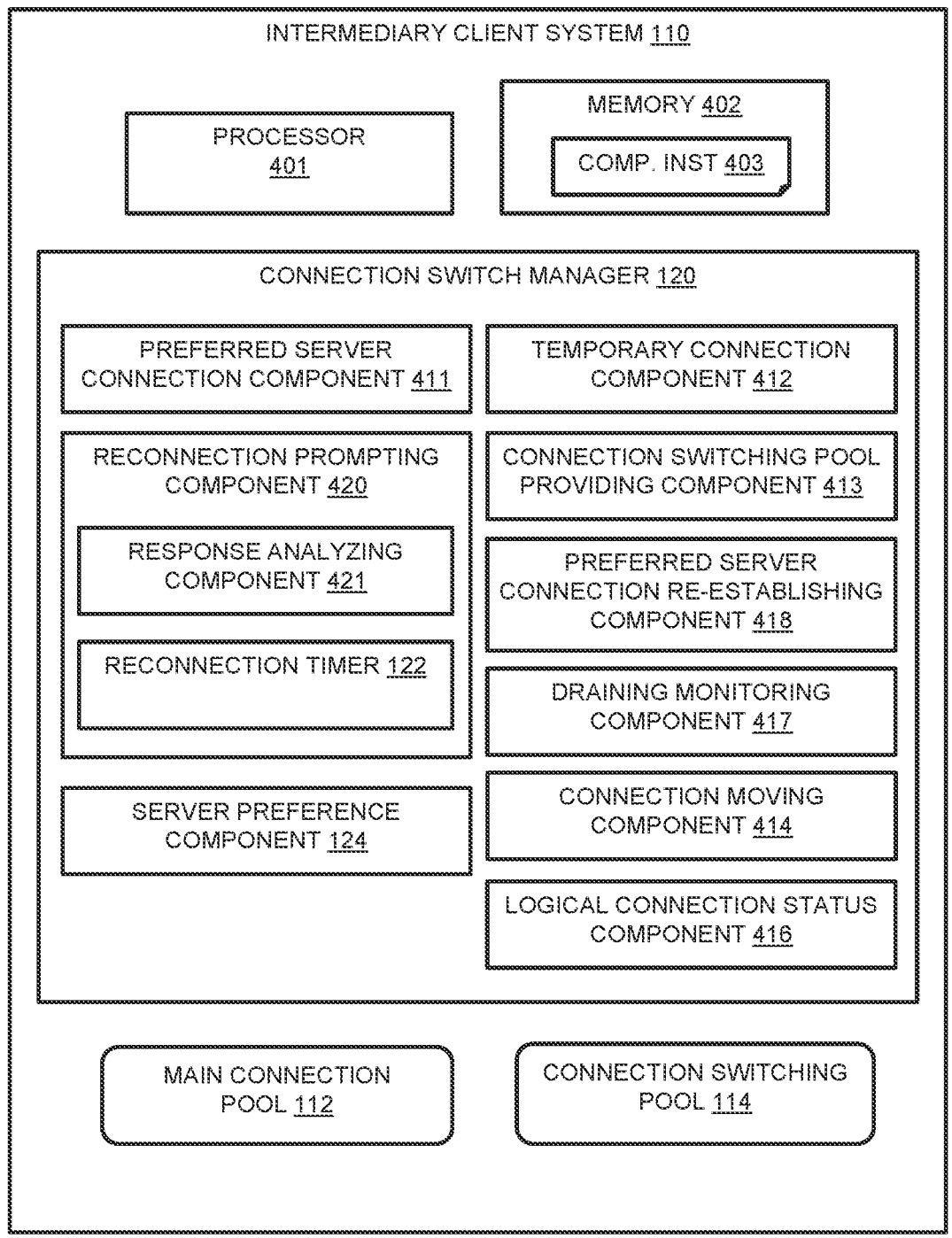
FIG. 4 is an example embodiment of a system in accordance with the present invention.

Referring to FIG. 4, a block diagram shows an example embodiment of an intermediary client system 110 including a connection switch manger 120.

The intermediary client system 110 includes at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions ("comp. Inst") 403 to the at least one processor 401 to carry out the functionality of the components.

The connection switch manger 120 includes a preferred server connection component 411 for monitoring a persistent connection to a preferred server to identify an unavailability of the preferred server. The connection switch manger 120 includes a temporary connection component 412 for establishing and monitoring a temporary persistent connection to an available server selected by a load balancer to replace the unavailable preferred server.

The connection switch manger 120 includes a reconnection prompting component 420 for prompting attempts to reconnect to the preferred server at intervals via the load balancer. The reconnection prompting component 420 includes a response analyzing component 421 for analyzing a response from the load balancer to a reconnection request to determine if the response is for connection to a preferred server, where the load balancer uses a load balancing algorithm to select the server. The reconnection prompting component 420 also includes a reconnection timer 122 for prompting a reconnection request to the preferred server when a reconnection time expires and resetting the reconnection timer when the reconnection is not to the preferred server. The reconnection prompting component 420 may use a capability request flow request of an interconnectivity protocol for connection to the server cluster.

The connection switch manger 120 includes a connection switching pool providing component 413 for providing a connection switching pool 114 at the intermediary client system 110. The connection switching pool 114 and a main connection pool 112 provide two connections to servers in the same server cluster for one logical connection.

The connection switch manger 120 includes a preferred server connection re-establishing component 418 for re-establishing a persistent connection with the preferred server for the logical connection using the connection switching pool whilst terminating the temporary persistent connection to the available server.

The connection switch manger 120 includes a draining monitoring component 417 for monitoring draining of requests using the main connection pool 112 to the available server and closing of the temporary persistent connection. The connection switch manger 120 includes a connection moving component 414 for moving a persistent connection with the preferred server to the main connection pool 112 from the connection switching pool 114 when all temporary persistent connection requests have been drained from the main connection pool 112.

The connection switch manger 120 includes a server preference component 124 for configuring criteria to define one or more preferred servers for the intermediary client system as a static configuration file using connection metadata and providing the configured criteria to define one or more preferred servers for the intermediary client system. The server preference component 124 may obtain additional information regarding the available servers to determine one or more preferred servers.

The connection switch manger 120 includes a logical connection status component 416 for providing and updating a status of the logical connection to define whether a reconnection attempt is required and for managing remote client requests to the two connections using the connection switching pool 114 and the main connection pool 112.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
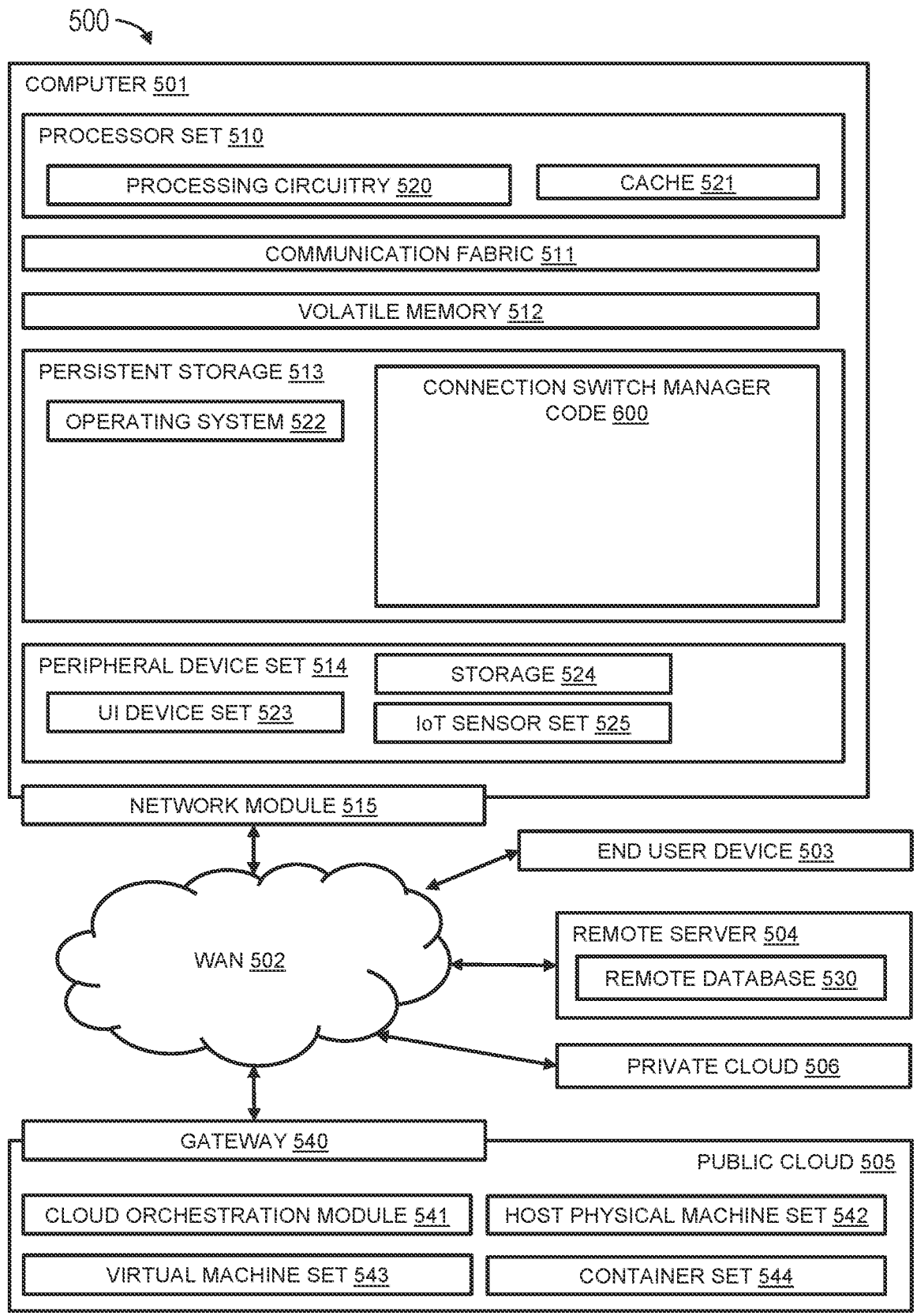
FIG. 5 is a block diagram of an example embodiment of a computing environment for the execution of at least some of the computer code involved in performing the present invention.

Referring to FIG. 5, computing environment 500 contains an example of an environment for the execution of at least some of the computer code involved in performing the inventive methods, such as connection switch manager code 600. In addition to block 600, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 600, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 600 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 600 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments.

Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for intermediary client reconnection to a preferred server in a high availability server cluster, comprising:
   monitoring a persistent connection of a logical connection to a preferred server to identify an unavailability of the preferred server, wherein the persistent connection uses a main connection pool;
   establishing a temporary persistent connection for the logical connection to an available server to replace an unavailable preferred server, wherein the temporary persistent connection uses the main connection pool;
   prompting attempts to reconnect to the preferred server at intervals; and
   providing a connection switching pool and simultaneously re-establishing a persistent connection with the preferred server for the logical connection using the connection switching pool while terminating the temporary persistent connection to the available server, wherein the connection switching pool and the main connection pool allow for simultaneously maintaining two connections to different servers in a same server cluster for the logical connection.

2. The computer-implemented method of claim 1, further comprising:
   providing and updating a status of the logical connection to define whether a reconnection attempt is required and for managing remote client requests to the two connections using the connection switching pool and the main connection pool.

3. The computer-implemented method of claim 1, wherein terminating the temporary persistent connection to the available server further comprises:
   monitoring draining of requests using the main connection pool to the available server before closing the temporary persistent connection.

4. The computer-implemented method of claim 1, further comprising:
   moving the persistent connection with the preferred server from the connection switching pool to the main connection pool once the temporary persistent connection is terminated.

5. The computer-implemented method of claim 1, wherein prompting attempts to reconnect to the preferred server at intervals further comprises:
   analyzing a response from a load balancer to a reconnection request to determine if the response is for connection to a preferred server, wherein the load balancer uses a load balancing algorithm to select the server.

6. The computer-implemented method of claim 5, further comprising:
   providing configured criteria to define one or more preferred servers for the intermediary client system; and
   wherein analyzing a response determines if the response meets the criteria.

7. The computer-implemented method of claim 1, wherein prompting attempts to reconnect to the preferred server at intervals further comprises:
   prompting a reconnection request to the preferred server when a reconnection timer expires; and
   resetting the reconnection timer when the reconnection is not to the preferred server.

8. The computer-implemented method of claim 1, further comprising:
   configuring criteria to define one or more preferred servers for the intermediary client system as a static configuration file using connection metadata.

9. The computer-implemented method of claim 8, wherein configuring criteria further comprises:
   obtaining additional information regarding the available server to determine one or more preferred servers.

10. The computer-implemented method of claim 1, wherein prompting attempts to reconnect to the preferred server at intervals using a load balancer uses a capability request flow request of an interconnectivity protocol for connection to the server cluster.

11. A computer system for intermediary client reconnection to a preferred server in a high availability server cluster, comprising:
   one or more computer processors;
   one or more computer readable storage media;

computer program instructions;

the computer program instructions being stored on the one or more computer readable storage media for execution by the one or more computer processors; and the computer program instructions including instructions to:

monitor a persistent connection of a logical connection to a preferred server to identify an unavailability of the preferred server, wherein the persistent connection uses a main connection pool;

establish a temporary persistent connection for the logical connection to an available server to replace an unavailable preferred server, wherein the temporary persistent connection uses the main connection pool;

prompt attempts to reconnect to the preferred server at intervals; and provide a connection switching pool and simultaneously re-establishing a persistent connection with the preferred server for the logical connection using the connection switching pool while terminating the temporary persistent connection to the available server, wherein the connection switching pool and the main connection pool allow for simultaneously maintaining two connections to different servers in a same server cluster for the logical connection.

12. The computer system of claim 11, further comprising instructions to:

provide and update a status of the logical connection to define whether a reconnection attempt is required and for managing remote client requests to the two connections using the connection switching pool and the main connection pool.

13. The computer system of claim 11, wherein terminating the temporary persistent connection to the available server further comprises:

monitoring draining of requests using the main connection pool to the available server before closing the temporary persistent connection.

14. The computer system of claim 11, further comprising instructions to:

move the persistent connection with the preferred server from the connection switching pool to the main connection pool once the temporary persistent connection is terminated.

15. The computer system of claim 11, wherein prompting attempts to reconnect to the preferred server at intervals further comprises instructions to:

analyze a response from a load balancer to a reconnection request to determine if the response is for connection to a preferred server, wherein the load balancer uses a load balancing algorithm to select the server.

16. The computer system of claim 15, further comprising instructions to:

provide configured criteria to define one or more preferred servers for the intermediary client system; and wherein the response is analyzed to determine if the response meets the criteria.

17. The computer system of claim 11, wherein prompting attempts to reconnect to the preferred server at intervals further comprises instructions to:

prompt a reconnection request to the preferred server when a reconnection timer expires; and reset the reconnection timer when the reconnection is not to the preferred server.

18. The computer system of claim 11, further comprising instructions to:

configure criteria to define one or more preferred servers for the intermediary client system as a static configuration file using connection metadata.

19. The computer system of claim 18, wherein configuring criteria further comprises instructions to:

obtain additional information regarding the available server to determine one or more preferred servers.

20. A computer program product for intermediary client reconnection to a preferred server in a high availability server cluster, the computer program product comprising one or more computer readable storage media and program instructions stored on the one or more computer readable storage media, the program instructions including instructions to:

monitor a persistent connection of a logical connection to a preferred server to identify an unavailability of the preferred server, wherein the persistent connection uses a main connection pool;

establish a temporary persistent connection for the logical connection to an available server to replace an unavailable preferred server, wherein the temporary persistent connection uses the main connection pool;

prompt attempts to reconnect to the preferred server at intervals; and provide a connection switching pool and simultaneously re-establishing a persistent connection with the preferred server for the logical connection using the connection switching pool while terminating the temporary persistent connection to the available server, wherein the connection switching pool and the main connection pool allow for simultaneously maintaining two connections to different servers in a same server cluster for the logical connection.

* * * * *